E. Rhodes, Jr., & J. W. Rhoades,
Fish Hook.
N° 60,786.    Patented Jan. 1, 1867.
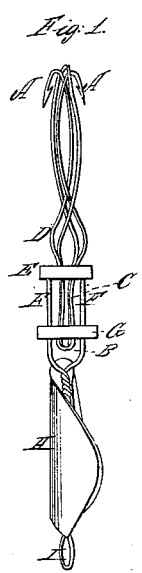
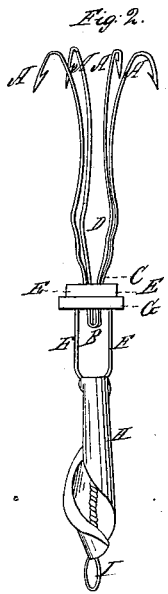
Witnesses:
W. H. Burridge
Frank Alden
Inventors:
Elias Rhodes Jr
James W Rhoades

United States Patent Office.

ELIAS RHODES, JR., AND JAMES W. RHOADES, OF CLYDE, OHIO.

Letters Patent No. 60,786, dated January 1, 1867.

IMPROVEMENT IN SPRING FISH-HOOKS.

*The Schedule referred to in these Letters Patent and making part of the same.*

TO ALL WHOM IT MAY CONCERN:

Be it known that we, ELIAS RHODES, Jr., and JAMES W. RHOADES, of Clyde, in the county of Sandusky and State of Ohio, have invented new and useful improvements in Fish and Trap-Hooks; and we do hereby declare that the following is a full and complete description of the construction and operation of the same, reference being had to the accompanying drawings, making part of this specification, in which—

Figure 1 is a view of the hook when set; and

Figure 2 is a view of the hook when expanded.

Our invention embraces two features: first, contracting and expanding of the hook, and, second, the device for trolling.

The hooks A A are made double, that is, a hook terminates each end of the wire of which it is composed. This wire is bent into the form of the letter U, as seen at B, and at a little distance from the bow end, the two branches are contracted slightly, as at C, and then again expand, as at D. Two sets of these hooks are united, as shown in the figures, in such position that the points of the hooks will project outward at nearly equal distances from each other, and when pressed together, as in fig. 1, form a compact group; but they are capable of expansion by their own elasticity to the position shown in fig. 2. F F represent two rods, of an inch or inch and a half in length, parallel to each other, and about half an inch apart; they terminate in a head, to which they are securely fastened by soldering or otherwise. Through the centre of this head is an opening, through which all the rods or wires from the hooks pass, and they are all secured in the cross-head G, which can be moved up and down on the ways F, and by this movement that portion of the rods between the cross-head G and the stationary head E are drawn through the opening in E, and by these means the hooks are "set." Now, if the hooks in this position are baited, upon being seized by a fish, or other animal, and drawn out through the opening in the head E, the hooks will suddenly expand to the position shown in fig. 2, and thus fix themselves in the mouth of the animal. By shoving back the cross-head G from its position in fig. 2 to its position in fig. 1, the hook is again set ready for another victim. H represents a spiral plate of metal, which constitutes an extension from the rods F F about two inches, to the loop I, where the line is attached. This spiral plate is designed for trolling for fish. By moving the hook with this attachment rapidly over the water, the hooks receive a rapid rotary motion, which is favorable to the capture of certain kinds of fish, as trout, &c. The spiral plate H may be made in any desired form that will produce the desired result, namely, the rotation of the baited hook upon the water.

Having thus described our invention, what we claim as new, and desire to secure by Letters Patent, is—

The hook and rods A B, having swell D and contraction C, in combination with the ways F F, stationary head E, cross-head G, spiral plate H, as and for the purpose substantially as specified.

ELIAS RHODES, JR.,
JAMES W. RHOADES.

Witnesses:
W. H. BURRIDGE,
FRANK ALDEN.